Oct. 13, 1942.  W. G. BURT, JR  2,298,463
BEARING SEAL
Filed Jan. 6, 1940
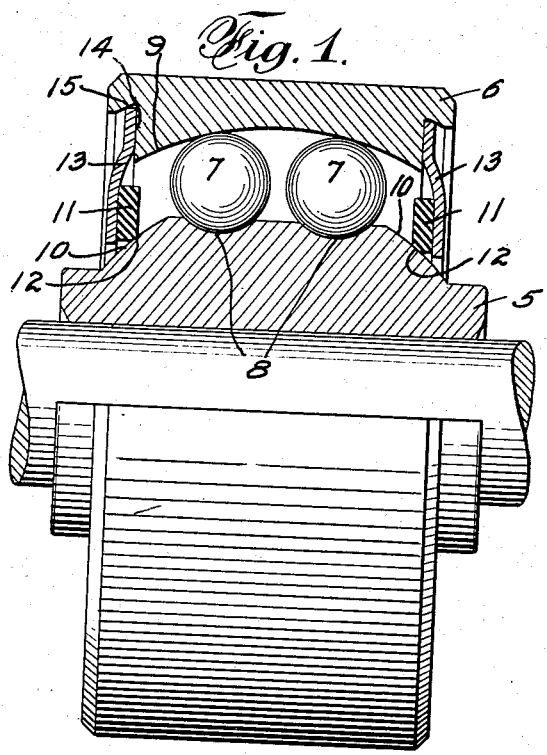
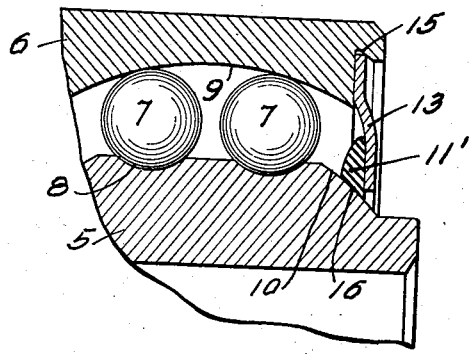
INVENTOR
WILLIAM G. BURT, JR.
BY
ATTORNEYS.

Patented Oct. 13, 1942

2,298,463

UNITED STATES PATENT OFFICE 2,298,463

BEARING SEAL

William Griswold Burt, Jr., New Britain, Conn., assignor to The Fafnir Bearing Company, New Britain, Conn., a corporation of Connecticut Application January 6, 1940, Serial No. 312,637

1 Claim. (Cl. 286—5)

My invention relates to a bearing and more particularly to a seal for a bearing.

It is an object of the invention to provide an improved, simple form of seal for an anti-friction bearing.

It is another object to provide a seal for a self-alining bearing which will be equally effective in substantially all positions of self-alinement of the bearing.

Another object is to provide a bearing with a seal which by its inherent resiliency will be constantly urged into contact with relatively rotatable sealing surfaces of the opposed rings.

Other objects and various features of novelty and invention will be hereinafter pointed out or will become apparent to those skilled in the art.

In the drawing which shows, for illustrative purposes only, preferred forms of the invention—

Fig. 1 is an edge view in quarter section of a bearing showing one form of the invention; and Fig. 2 is a fragmentary, sectional view of the bearing shown in Fig. 1 and illustrating a slightly modified form of seal.

My improved seal, while not exclusively adapted for use on self-alining bearings, is nevertheless of particular utility in connection with such bearings and has been illustrated in connection with a self-alining bearing. Such a bearing includes an inner bearing ring 5 and an outer bearing ring 6, with interposed anti-friction bearing members, such as balls 7. The inner ring may be provided with one or more raceway grooves 8 and the outer ring is provided with a spherical seat 9, the center of the sphere being in the longitudinal axis of the bearing. Thus, as will be understood, the bearing is capable of self-alinement.

One of the rings is provided with a generally tapering, preferably spherical sealing seat and a seal ring is forcibly urged into said seat so as to stress the seal ring in a generally radial direction and consequently, due to the resiliency of the seal ring, to urge the latter in a generally axial direction. The other of the rings is provided with means to abut the seal ring and thus hold the latter in its stressed condition in sealing contact with its seat and with such abutment means.

In the form illustrated the inner ring is provided with a generally tapering seal surface 10, which is preferably of spherical form concentric with the spherical race surface 9. A seal ring 11, preferably of resilient material, such as synthetic rubber of the type known as "Neoprene," is formed as an annular continuous seal ring and is stressed by being stretched radially onto the seal surface 10, so as to be in relatively tight sealing engagement with the seat surface 10. The edge of the seal ring 11, where it contacts the seal surface 10, is shown as having a substantial area, as indicated at 12. Such area may be a preformed one or may be provided by deformation of the edge of the seal ring 11, where it forcibly contacts the seal surface 10.

The seal ring 11 is held in its stressed condition and in sealing contact with the inner ring by suitable means, such as a seal plate 13, which may be seated against the bottom of a counterbore, as indicated at 14, so as to be in tight sealing engagement with the outer ring and the outer edge of the seal plate 13 may be swedged or otherwise secured in an undercut groove 15 in the outer bearing ring, as will be understood. The seal ring 11, as stated, being preferably of resilient material and stressed by being forced up onto a larger diameter of the seal surface, tends to wedge itself into the angular space between the seal plate 13 and the seal surface 10 so as to be in relatively tight sealing engagement with both the seal plate 13 and the seal surface 10. In all positions of self-alinement of the bearing the seal ring 11 may slide over the spherical surface 10 and will tend to hug that surface and remain in sealing contact with the seal plate 13, so as to provide a tight seal against loss of lubricant and ingress of foreign matter and this regardless of irregularities in the formation of the surface 10 and even if the surface 10 is not a strictly spherical surface.

My improved seal is particularly adapted for use as airplane bearings in which cleaning fluid is often quite forcibly applied to the airplane and consequently to the outside of the bearings. The seal plate 13, being preferably of sheet metal or the like, will serve as adequate protection against mechanical injury to the seal ring. The proportions of the parts are preferably such that the seal plate 13 serves to limit the extent of self-alinement of the two rings by contacting at its inner edge with an adjacent portion of the inner ring at the limit of self-alinement.

In the modified form of the invention shown in Fig. 2 the parts may be substantially the same and function in substantially the same manner as heretofore described. The seal ring 11', however, is of slightly different form and is preferably molded substantially into the shape shown; that is, the seal ring 11' has a preformed surface 16 of substantial extent to fit upon the adjacent spherical seal surface 10 of the inner ring.

While the invention has been described in considerable detail and preferred forms shown, it is to be understood that various changes may be made within the scope of the invention as defined in the appended claim.

I claim:

Seal means for a bearing including a pair of concentric rings one within the other and held in axially self-aligning relationship about a point on the axis of both rings, the inner of said rings having a seal seat of generally spherical form having its center of generation substantially on the point aforesaid on the axis of both said rings, said seal means including a seal disk carried by said outer ring and extending across the space between said rings and into proximity to said generally spherical seal seat and forming with the latter a generally radially inwardly directed generally V-shaped groove, and an annular seal ring of yielding resilient rubber-like material stretched over said generally spherical seal seat and contractible by its own resiliency into sealing contact with both said seal disk and said generally spherical seat.

WILLIAM GRISWOLD BURT, Jr.